United States Patent
Hawley

[11] 3,902,999
[45] Sept. 2, 1975

[54] FILTER UNIT FOR WELDING APPARATUS

[75] Inventor: Clyde W. Hawley, Fairport, N.Y.

[73] Assignee: Dollinger Corporation, Rochester, N.Y.

[22] Filed: Dec. 10, 1973

[21] Appl. No.: 423,414

[52] U.S. Cl. .................. 210/90; 55/337; 55/467; 210/304; 210/416
[51] Int. Cl.² .......................................... B01D 50/00
[58] Field of Search ............ 55/274, 337, 357, 467, 55/472; 210/360 A, 90, 380, 512 R, 304, 416

[56] References Cited
UNITED STATES PATENTS

| | | | |
|---|---|---|---|
| 602,964 | 4/1898 | Van Gelder | 55/337 X |
| 2,927,659 | 3/1960 | Pabst et al. | 55/274 X |
| 3,046,717 | 7/1962 | Northrup et al. | 55/337 X |
| 3,068,831 | 12/1962 | Witchell | 55/274 X |
| 3,262,573 | 7/1966 | Schutte | 210/380 |
| 3,382,651 | 5/1968 | Hahl et al. | 55/337 |
| 3,488,928 | 1/1970 | Tarala | 55/274 |
| 3,626,545 | 12/1971 | Sparrow | 55/337 X |
| 3,716,967 | 2/1973 | Doyle, Jr. et al. | 55/337 X |

FOREIGN PATENTS OR APPLICATIONS

828,317  1/1952  Germany .................. 55/337

Primary Examiner—Samih N. Zaharna
Assistant Examiner—Robert H. Spitzer
Attorney, Agent, or Firm—Shlesinger, Fitzsimmons & Shlesinger

[57] ABSTRACT

This unit includes a two-piece, cylindrical canister partitioned intermediate ends into upper and lower chambers connected by a hole in the center of the partition. A filter cartridge in the upper chamber has an axial bore closed at its lower end and connected at its upper end to the inlet of a vacuum motor, which is mounted on the upper end of the canister. A dust inlet in the lower chamber is connected to a nipple or duct which is inclined transverse to the canister axis and a line radially thereof. When the motor is operated smoke and spatter sparks enter the lower chamber nearly tangentially and are swirled therein so that heavy particles and sparks are flung by centrifugal forces against the chamber wall and drop harmlessly to the canister bottom. Lighter particles rise to the upper chamber and are filtered out by the cartridge as the air passes radially therethrough to the vacuum motor.

3 Claims, 2 Drawing Figures

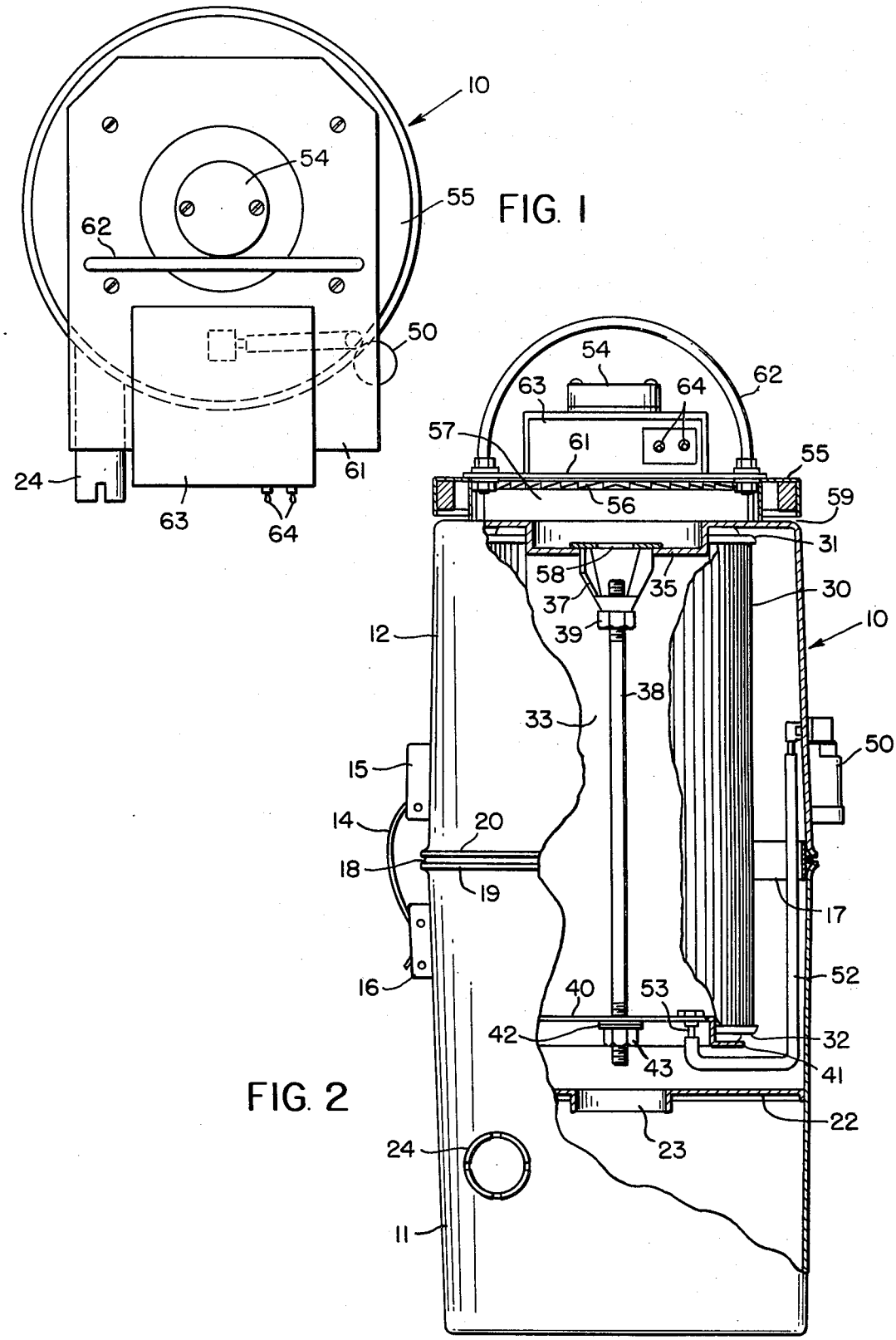

FILTER UNIT FOR WELDING APPARATUS

This invention relates to air filters, and more particularly to a filter unit for use in connection with welding apparatus to remove weld smoke from the vicinity of the work.

A major problem encountered by many welders during a welding operation is the difficulty of getting a clear view of the work being welded. During an arc welding operation, for example, substantial amounts of smoke and fumes are generated in the immediate area of the weld, thus obscuring the operator's vision and producing noxious fumes, which contribute to the operator's discomfort.

One manner of reducing such welding smoke is to employ a vacuum or suction system, which is connected to the welding apparatus, and which has an inlet located immediately adjacent the head or tip of the welding instrument. Weld smoke and fumes are thus purged from the area of the weld and conveyed to a filter unit which removes spatter sparks and other particles from the smoke before exhausting to atmosphere.

Of particular importance in this system is the filter unit, which is used to remove the dust and particles from the smoke generated by a welding operation. Prior, known filter units, however, have not proved to be satisfactory for this purpose.

It is an object of this invention, therefore, to provide a novel filter unit for use in conjunction with welding apparatus of the type described to help eliminate weld smoke in the vicinity of the weld.

A further object of this invention is to provide an improved filter unit which has thereon a visual warning device which indicates the extent to which the filter has become clogged through use.

Another object is to provide a welding smoke-filter unit which includes a built-in vacuum motor for drawing fumes from the area of the weld and successively through a centrifugal separating chamber and a filter.

Still another object of this invention is to provide an improved filter unit of the type described which is substantially more compact, versatile and reliable than prior such units.

Other objects of the invention will be apparent hereinafter from the specification and from the recital of the appended claims, particularly when read in conjunction with the accompanying drawing.

In the drawing:

FIG. 1 is a plan view of a filter unit made in accordance with one embodiment of this invention; and FIG. 2 is an elevational view of this unit showing parts of its casing and filter cartridge broken away and shown in section for purposes of illustration.

Referring now to the drawing by numerals of reference, 10 denotes generally a two-piece filter canister having a lower, generally can-shaped section 11, and an upper inverted section 12 of similar configuration. The open ends of sections 11 and 12 are releasably secured together by a plurality of conventional clamps or clasps 14 (only one of which is shown in FIG. 2), which are mounted at one end to pivot on angularly spaced lugs 16 that project from section 11 adjacent its upper end. These clamps are releasably engageable in known manner at their opposite ends with angularly spaced lugs 15 that are arranged around the lower end of section 12. An annular collar 17 on the upper end of section 11 projects snugly and coaxially into the lower end of section 12, and is surrounded by a resilient O-ring 18. The confronting, open ends of the sections 11 and 12 are provided with rolled lip portions 19 and 20, respectively, which are held by the clamps 14 snugly against opposite sides of the O-ring 18 to seal the connection between the two canister sections.

Intermediate its ends the lower canister section 11 has secured therein a rigid, transverse sump plate 22, which has an axial bore 23 disposed coaxially of the canister. Beneath plate 22 the lower section 11 is provided with an inlet nipple or duct 24, the inner end of which opens on the interior of section 11 beneath plate 22, and the axis of which is inclined at right angles to the canister axis and to a line extending radially of the canister.

Releasably mounted within the canister 10 is a conventional, pleated filter cartridge 30, which has resilient, annular end caps 31 and 32, and an axial bore 33, which registers with the axial bores or openings in the end caps. The bore in the upper end cap 31 is seated snugly around a cylindrical boss 35, which projects coaxially inwardly from the upper end of canister section 12. The legs of a spider-shaped bracket 37 project through a central opening in the boss 35, and are integral with a ring flange 58 which is mounted on the upper side of boss 35 coaxially of its opening. Adjustably threaded into the lower end of bracket 37 is the upper end of an elongate mounting bolt 38. A lock nut 39 is threaded on bolt 38 against the underside of bracket 37 to secure bolt 38 in a vertically adjusted position relative to the bracket.

A generally dish-shaped cover plate 41 is secured over the lower end cap 32 with its central, cylindrically shaped portion 40 projecting snugly into the bore in the cap. The lower end of bolt 38 projects slidably and coaxially through the central portion 40 of the cover plate 41, and has thereon a plurality of washers 42 and a mounting nut 43, which can be threaded onto the bolt to draw plate 41 snugly against cap 32 to seal the lower end of the cartridge, and also to urge the upper end cap 31 sealingly over the canister boss 35.

A pressure drop indicator 50 is secured by screws or the like (not illustrated) to the lower end of canister section 12, and is connected by tubing 52 to a nipple 53 that is secured in cover section 40 to communicate with the bore 33 of the filter cartridge 30.

Secured on the upper end of canister section 12 is a vacuum unit comprising an impeller housing 55 and a vacuum motor 54. Secured to the motor armature for rotation in housing 55 coaxially of the canister is an impeller 56 (FIG. 2) of the peripheral discharge variety. Impeller 56 has its inlet side facing an opening or chamber 57 which is formed in the underside of the motor housing 55, and which communicates through the bore in ring flange 58 and the spaces between the legs of bracket 37 with the bore 33 of the filter cartridge 30. When the motor 54 is operated, the impeller 56 creates a vacuum at the side thereof facing the opening 57, and thus causes air to be drawn from the bore 33 in the cartridge 30 and to be discharged radially from the periphery of the impeller through the space 59 between the housing 55 and canister 10.

Mounted on a plate 61, which is fastened on top of the impeller housing 55, is a handle 62 for manipulating the canister, and a control box 63 containing the circuitry which controls the vacuum motor 54. Box 63 may have mounted thereon one or more manually operable switches 64 for controlling the motor circuit, the details of which form no part of this invention.

In use, the nipple 24 is connected by flexible hose or tubing to an inlet nozzle (not illustrated), which is located adjacent to the tip of a welding instrument, so that when the motor 54 is energized the vacuum created by its impeller 56 will cause air, smoke, fumes, sparks, etc. to be drawn into the filter canister 10 through the inlet 24. As previously noted, the axis of nipple 24 is inclined to the axis and radius of the canister, so that when air is sucked into the canister by the motor 54 it is caused to swirl in cyclonic fashion around the inside of the chamber formed in section 11 beneath the sump plate 22. The heavier particles and spatter sparks in the swirling air or gas are flung radially outwardly by centrifugal forces and thus strike the inner surface of the section 11, which reduces their velocity to the point where they drop harmlessly to the bottom of the canister beneath the plate 22. During this period plate 22 prevents the heavier particles and sparks from passing upwardly into the upper chamber containing the cartridge 30.

Not all of the smoke particles, etc. are heavy enough to be separated out from the incoming air in the canister's centrifuge chamber. Such lighter particles are carried upwardly through the bore 23 in plate 22 to the annular space between the cartridge 30 and the canister 10. From this annular space air passes through the pores of the filter cartridge 30 to its bore 33, and then through the legs of the bracket 37, ring flange 58, and the opening 57 to the impeller 56, which then discharges the air peripherally out of the motor. As the nearly particulate-free air passes radially inwardly through the porous folds in the filter cartridge 30 the remaining, lighter smoke particles, etc., are filtered out of the air by the cartridge, so that the air is clean by the time it is exhausted from the impeller housing 55.

When the motor 54 is in operation and the filter cartridge 30 is clean, air flows rather rapidly through the pores of the cartridge, so that the vacuum generated in its bore 33, which is applied through the nipple 53 and the tubing 52 to the indicator 50, will normally not effect a red warning element in a window 50 in the indicator. However, after prolonged use, as the cartridge 30 begins to become clogged, and the passage of air through the filter becomes more difficult, the resultant increased vacuum in the bore 33 will cause the red warning element to appear in the window in the indicator 50, and will provide an indication of the approaching need to clean or replace the filter cartridge.

From the foregoing it will be apparent that the instant invention provides very compact and reliable means for removing weld smoke from the vicinity of the work. The filter cartridge 30 is positioned before, or in advance of, the vacuum system, as represented by the motor 54, and hence prolongs the life of the system. Moreover, the centrifugal cleaning effect imparted by the inclined inlet 24 to the incoming gases helps to enhance the overall useful life of the cartridge 30 by removing spatter sparks and a substantial quantity of the particulate matter in the waste gases or smoke before the latter enter the upper filter chamber, which is located above the sump plate 22. Plate 22 operatively divides the housing or casing 10 into two different chambers in one of which separation of the particles is caused by the centrifuge effect, and in the other of which a simple filtering operation takes place. Moreover, by employing the pressure drop indicator 50, the operating efficiency of the unit is increased since a dirty or improperly operating filter cartridge 30 can be instantly detected and replaced or cleaned.

While only one embodiment of the invention has been disclosed in detail herein, further modification thereof will be readily apparent to one skilled in the art, and this application is intended to cover any such modification which falls within the purview of this disclosure and the appended claims.

Having thus described my invention what I claim is:
1. A fluid filter unit, comprising
a housing comprising two, generally cylindrical, can-shaped sections having their open ends releasably and sealingly secured together with one section disposed coaxially above the other section,
a transverse partition mounted in the lower of said two housing sections intermediate its ends and having therein a central opening,
an electric motor mounted on the upper of said two housing sections,
an impeller mounted on the upper end of said upper housing section in registry with an opening therein, and connected to said motor for rotation thereby about an axis coaxial with said housing to apply a vacuum to the inside of said housing through said opening in the upper section of said housing,
a single annular filter cartridge removably fixed at its upper end to the upper end of said upper housing section coaxially thereof and projecting downwardly into said lower section in radially spaced relation to the inside of said housing,
said impeller having an inlet side communicating through said opening in the upper end of said housing with the bore in said cartridge, and having around its periphery an outlet for exhausting fluid outwardly therefrom during use,
said cartridge having a closed, transversely extending lower end positioned above and in spaced relation to the opening in said partition,
means extending through the bore in said cartridge for releasably attaching its closed, lower end to the upper end of said upper housing section, and
a duct secured in an inlet opening in said lower housing section beneath said partition, and extending at its opposite end exteriorly of said housing for conveying the fluid to be filtered into said lower section beneath said partition,
said duct having an axis extending transverse to the axis of said housing and being constructed and arranged, whereby, upon operation of said motor, fluid drawn through said duct is first swirled in cyclonic fashion in said lower section to remove particles therefrom by a combination of centrifugal and gravitational forces, and then passes upwardly through the opening in said partition to impinge against and to pass around the closed end of said cartridge into the annular space between said cartridge and the inside wall of said housing, and from said space through said cartridge and its bore and the opening in the upper end of said housing to said impeller.
2. A fluid filter unit as defined in claim 1, wherein
a pressure drop indicator is mounted on said upper section exteriorly thereof and is connected to the bore in said cartridge to measure the vacuum in said bore and is movable as a unit relative to said lower housing section with said filter cartridge and said upper section of the housing without interfering with the connection between said cartridge and said indicator, when said two sections are released one from the other.

3. A fluid filter unit as defined in claim 2, wherein
the upper end of the bore in said cartridge is removably and sealingly seated over said opening in said upper section for communication with impeller,
a cover plate is positioned over the lower end of said bore in said cartridge, said means for releasably attaching the cartridge to said upper section comprises an elongate bolt extending centrally through the bore in said cartridge, and means is provided for adjustably securing opposite ends of said bolt to the upper end of said upper section and to said cover plate, respectively, thereby releasably to secure said cartridge between said plate and the upper end of said upper section.

* * * * *